(12) United States Patent
Ito

(10) Patent No.: US 8,654,131 B2
(45) Date of Patent: Feb. 18, 2014

(54) VIDEO IMAGE PROCESSING APPARATUS AND VIDEO IMAGE PROCESSING METHOD

(75) Inventor: Hironao Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 13/073,280

(22) Filed: Mar. 28, 2011

(65) Prior Publication Data

US 2011/0243474 A1    Oct. 6, 2011

(30) Foreign Application Priority Data

Apr. 6, 2010   (JP) ................................ 2010-087850
Jan. 25, 2011  (JP) ................................ 2011-013263

(51) Int. Cl.
*G06F 15/00* (2006.01)

(52) U.S. Cl.
USPC .......................................... 345/501; 345/530

(58) Field of Classification Search
USPC ......................................................... 345/501
See application file for complete search history.

(56) References Cited

U.S. PATENT DOCUMENTS

| | | | |
|---|---|---|---|
| 6,727,907 B2 * | 4/2004 | Nonomura et al. ........... | 345/603 |
| 2001/0040924 A1 * | 11/2001 | Hori et al. ................. | 375/240.16 |
| 2002/0057343 A1 * | 5/2002 | Ronk et al. ..................... | 348/169 |
| 2005/0128293 A1 * | 6/2005 | Wilsey et al. ................. | 348/143 |

FOREIGN PATENT DOCUMENTS

JP   2009-065712   3/2009

* cited by examiner

*Primary Examiner* — Xiao Wu
*Assistant Examiner* — Sohum Kaji
(74) *Attorney, Agent, or Firm* — Cowan, Liebowitz & Latman, P.C.

(57) ABSTRACT

To present relevant information about an object of interest to a viewer in an appropriate timing based on the display state of objects that appear in a video image. A video image processing apparatus 10 processes the additional information including content data and relevant information about the respective objects. A display feature information calculation unit 107 acquires frame data indicating the display state of an object to be displayed in each frame constituting video data and calculates display feature information about the object to be displayed in each frame. A frame evaluation unit 108 evaluates a frame using an evaluation criteria relating to the degree of attention of the object within a frame based on the calculated display feature information. A display timing determination unit 109 determines a frame at which displaying relevant information about the object is to be started in accordance with the frame evaluation result. A display data generation unit 110 generates data for displaying relevant information about an object, and a superimpose unit 104 superimposes the data with video data, and output the superimposed data to a display unit 105.

20 Claims, 15 Drawing Sheets

FIG. 2A

Object data

| Object ID | Name | Role name | Main works | ... |
|---|---|---|---|---|
| 1 | AAA | BBB | CCC,DDD,EEE | ... |
| 2 | FFF | GGG | HHH,III,JJJ | ... |
| 3 | KKK | – | LLL | ... |
| . | . | . | . | |
| . | . | . | . | ... |
| . | . | . | . | |

FIG. 2B

Frame data

| Frame ID | Object ID | Depth Z | x-axis coordinate | y-axis coordinate | Width | Height |
|---|---|---|---|---|---|---|
| 0 | 1 | 0 | 500 | 200 | 800 | 800 |
| 0 | 2 | 0 | 100 | 100 | 100 | 100 |
| 1 | 1 | 0 | 500 | 201 | 800 | 800 |
| 1 | 2 | 0 | 100 | 101 | 100 | 100 |
| 1 | 3 | 1 | 100 | 61 | 100 | 100 |
| 2 | 1 | 0 | 500 | 202 | 300 | 300 |
| 2 | 2 | 0 | 100 | 102 | 100 | 100 |
| . | . | . | . | . | . | . |
| . | . | . | . | . | . | . |
| . | . | . | . | . | . | . |

| Object ID | Object size | Distance from the center of screen | Motion amount | Overlap region size | Brightness | Face direction |
|---|---|---|---|---|---|---|
| 1 | 640000 | 85 | 1 | 0 | 200 | 1 |
| 2 | 10000 | 911 | 1 | 0 | 150 | 1 |
| 3 | 10000 | 916 | 0 | 6000 | 100 | 0 |

FIG. 7

| Object ID | Frame count start frame ID | Frame count | Display history |
|---|---|---|---|
| 1 | 120 | 180 | None |
| 2 | 250 | 50 | None |
| 3 | None | 0 | 220 |
| . | . | . | . |
| . | . | . | . |
| . | . | . | . |

FIG. 9A

| Frame ID | Object ID | Depth Z | x-axis coordinate | y-axis coordinate | Width | Height |
|---|---|---|---|---|---|---|
| 0 | 1 | 0 | 500 | 200 | 800 | 800 |

| Frame ID | Object ID | x-axis coordinate | y-axis coordinate | Width | Height |
|---|---|---|---|---|---|
| 1 | 1 | 500 | 200 | 800 | 800 |

| Frame ID | Object ID | x-axis coordinate | y-axis coordinate | Width | Height |
|---|---|---|---|---|---|
| 2 | 1 | 500 | 200 | 800 | 800 |

FIG. 9B

| Object ID | Object size | Distance from the center of screen | Motion amount | Overlap region size | Brightness | Face direction |
|---|---|---|---|---|---|---|
| 1 | 64000 | 85 | 0 | – | 200 | – |

FIG. 12A

| Evaluation item | Numerical value | Evaluation value |
|---|---|---|
| Object size | 800(pixel) | 8 |
| Distance from the center of screen | 40(pixel) | 9 |
| Motion amount | 1000(pixel) | 8 |
| Object brightness | 128 | 10 |
| The number of objects in frame | 1 | 10 |
| Total |  | 9 |

FIG. 12B

| Evaluation value | 0 | 1 | 2 | 3 | 4 | 5 | 6 | 7 | 8 | 9 | 10 |
|---|---|---|---|---|---|---|---|---|---|---|---|
| The number of display frames | 150 | 180 | 210 | 240 | 270 | 300 | 330 | 360 | 390 | 420 | 450 |

FIG. 16A

| Evaluation value | 0 | 1 | 2 | 3 | 4 | 5 | 6 | 7 | 8 | 9 | 10 |
|---|---|---|---|---|---|---|---|---|---|---|---|
| Font size | 28 | 32 | 36 | 40 | 44 | 48 | 52 | 56 | 60 | 64 | 68 |

FIG. 16B

| Evaluation value | 0 | 1 | 2 | 3 | 4 | 5 | 6 | 7 | 8 | 9 | 10 |
|---|---|---|---|---|---|---|---|---|---|---|---|
| The number of characters | 5 | 10 | 20 | 30 | 40 | 50 | 60 | 70 | 80 | 90 | 100 |

FIG. 16C

| Evaluation value | Information item |
|---|---|
| 0~2 | Name 1 (Name of actor, etc.) |
| 3~5 | Name 1 (Name of actor, etc.)<br>Name 2 (Role name, etc.) |
| 6~8 | Name 1 (Name of actor, etc.)<br>Name 2 (Role name, etc.)<br>Information 1 (Description about role, etc.) |
| 9~10 | Name 1 (Name of actor, etc.)<br>Name 2 (Role name, etc.)<br>Information 1 (Description about role, etc.)<br>Information 2 (Previous works, etc.) |

FIG. 17

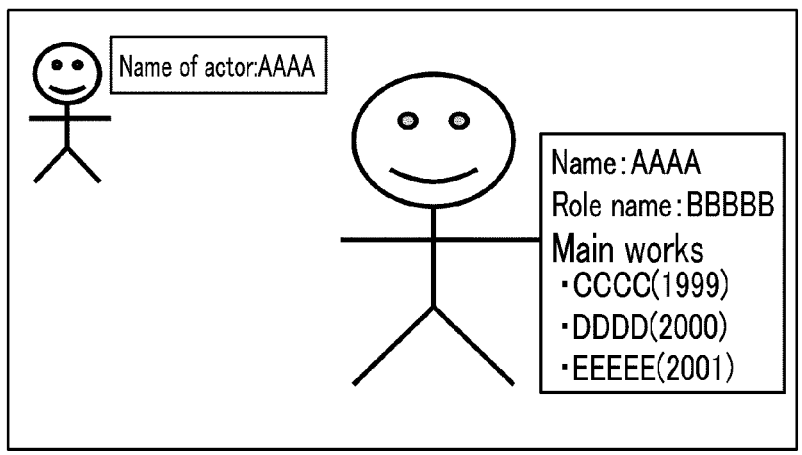

VIDEO IMAGE PROCESSING APPARATUS AND VIDEO IMAGE PROCESSING METHOD

BACKGROUND OF THE INVENTION

1. Field of the Invention

The present invention relates to a video image processing apparatus and a video image processing method that receive video content and meta data and perform processing for viewing content.

2. Description of the Related Art

Currently, for content to be transmitted using a broadcast wave or the like, not only video/sound data but also various meta data serving as the additional information have been added. Also, for content data stored in a storage medium such as DVD or the like, various utilization forms for the additional information have been contemplated. In the future, the use of further detailed additional information will be expected, and thus an improvement in convenience is anticipated.

While there are many methods for applying additional information, various technologies in which the additional information is presented to users to make them readily grasp information content, persons, and the like for the content to thereby support viewing have been proposed. Hereinafter, the components constituting a video image, for example, characters such as persons or the like and items such as chairs, buildings, and the like are referred to as "objects". A technology has been known for receiving video sound content and meta data including relevant information associated with the playback time of the content to thereby play back video sound content as well as display relevant information corresponding to the playback time (see Japanese Patent Laid-Open No. 2009-65712).

In this prior art, relevant information associated with a program and a scene is presented to a viewer in a timing specified by a receiver. However, the conventional technology does not control the timing for presenting relevant information about an object based on the display state of the object appearing on a video image.

For example, when a person of interest is displayed on a screen in a reduced size, or when many other persons are displayed on a screen, relevant information about the persons needs to be presented to a viewer at an appropriate timing. Otherwise, a situation may occur such that a viewer has difficulty understanding the fact that the presented relevant information relates to which person.

Accordingly, the present invention provides a video image processing apparatus and a video image processing method that are capable of presenting relevant information about an object to a viewer in an appropriate timing based on the display state of the object that appears on a video image.

SUMMARY OF THE INVENTION

In view of the foregoing, according to an aspect of the present invention, a video image processing apparatus that performs display control of relevant information about an object included in video data is provided that includes a display feature information calculation unit configured to acquire frame data indicating a display state of an object to be displayed in each frame constituting the video data and calculate display feature information about the object to be displayed in each frame; a frame evaluation unit configured to acquire the display feature information calculated by the display feature information calculation unit, and determine whether or not the display feature information for each frame satisfies an evaluation criteria relating to the degree of attention of the object to thereby perform a frame evaluation; and a display timing determination unit configured to determine a frame at which displaying relevant information about the object is to be started when the number of frames satisfying the evaluation criteria extends continuously over a threshold value as the result of the frame evaluation by the frame evaluation unit.

According to the present invention, display control of relevant information about an object can be performed in accordance with the frame evaluation result based on the evaluation criteria related to the degree of attention of objects in a video image, whereby a user's convenience is increased.

Further features of the present invention will become apparent from the following description of exemplary embodiments with reference to the attached drawings.

BRIEF DESCRIPTION OF THE DRAWINGS

FIG. 2A is a diagram illustrating an example of object data for explaining a first embodiment of the present invention in conjunction with FIGS. 3 to 7.

FIG. 2B is a diagram illustrating an example of frame data for explaining a first embodiment of the present invention in conjunction with FIGS. 3 to 7.

FIG. 7 is a diagram illustrating an example of frame count management information.

FIG. 9A is a diagram illustrating an example of frame data.

FIG. 9B is a diagram illustrating an example of display feature information.

FIG. 12A is a diagram illustrating an example of evaluation values for each frame evaluation item and a frame total evaluation value.

FIG. 12 B is a diagram illustrating an example of a determination table showing evaluation values for each frame evaluation item and the number of display frames depending on the frame total evaluation value.

FIG. 16A is a diagram illustrating an example of a determination table when a character size is determined.

FIG. 16B is a diagram illustrating an example of a determination table when the number of characters is determined.

FIG. 16C is a diagram illustrating an example of a determination table when an information item(s) is determined.

FIG. 17 is a diagram illustrating an example of a display screen when the display size and the display content of relevant information are changed depending on an object.

DESCRIPTION OF THE EMBODIMENTS

The video image processing apparatus of the present invention processes video data and additional information therefor. Display control of the relevant information about each object constituting the video image is carried out by, for example, an embodiment in which the apparatus includes a display section and another embodiment in which the apparatus outputs a video signal to display video on an external display device.

First Embodiment

Hereinafter, a first embodiment of the present invention will now be described. In the video image processing apparatus according to the first embodiment, the display timing of relevant information is controlled when an object, to which relevant information has been added, appears during the playback of content.

Figure 1:
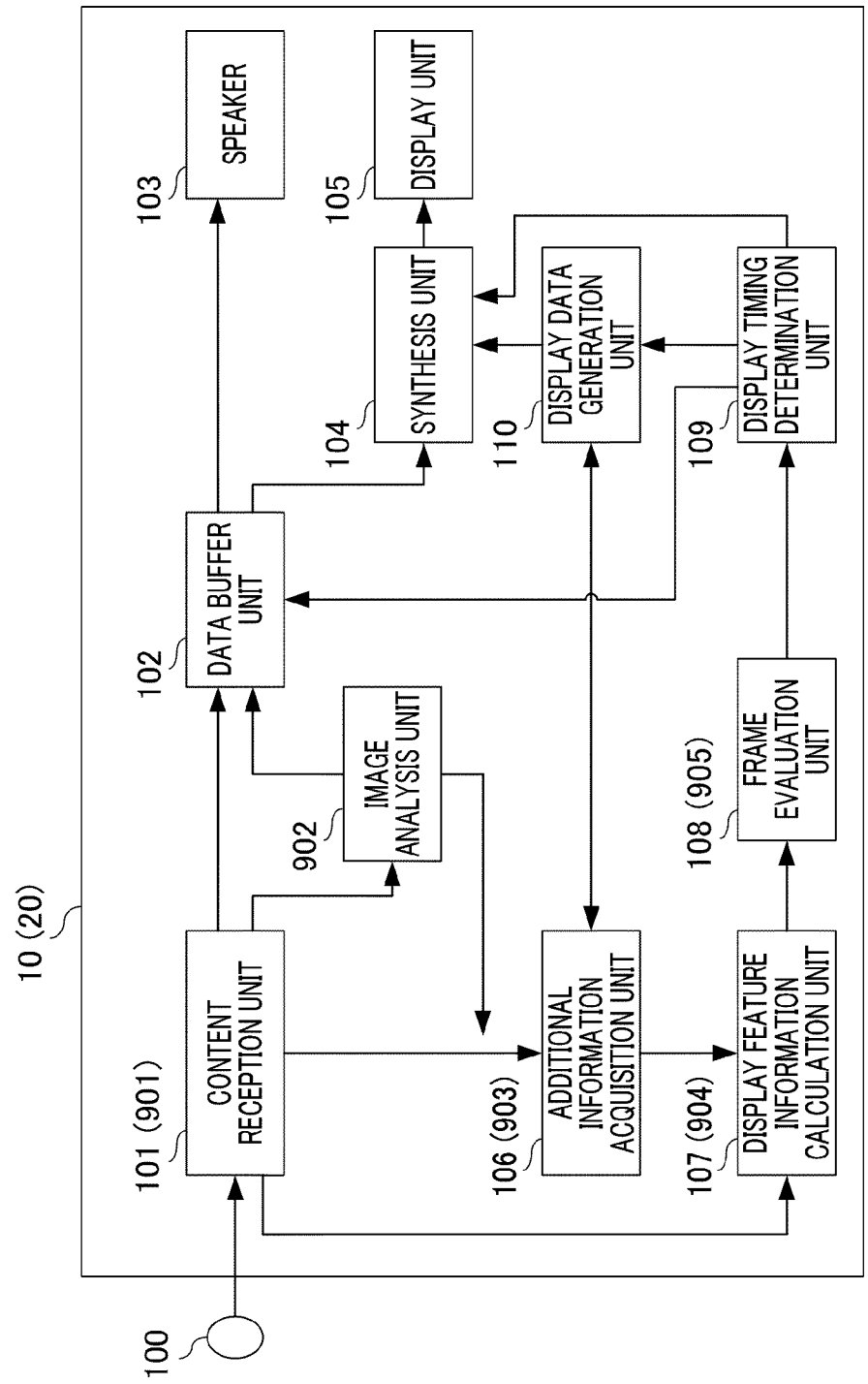
FIG. 1 a block diagram illustrating an example of the schematic configuration of an apparatus according to one embodiment of the present invention.

FIG. 1 is a block diagram illustrating an example of the configuration of a content reception apparatus as a video image processing apparatus 10. A content reception unit 101 receives content data from an external interface 100. The external interface 100 is an interface for receiving content data from a transmission path, and, for example, a digital broadcast receiving antenna, an internet connection router, and the like may be employed. Also, any type of content data may be employed as long as the additional information can be added to a video-sound signal. In the present embodiment, a description will be given taking MPEG2-TS as an example. The MPEG2-TS (transport stream) type defines a video-sound multiplexing system. MPEG is an abbreviation for "Moving Picture Experts Group". The content reception unit 101 separates the additional information from the received MPEG2-TS data, and outputs the additional information to the additional information acquisition unit 106. Also, the content reception unit 101 decodes a video-sound signal, and outputs the decoded video-sound signal to a data buffer unit 102.

The data buffer unit 102 for data accumulation holds a video-sound signal received from the content reception unit 101 for a certain period of time (a time corresponding to the predetermined number of frames), and then outputs a sound signal to a speaker 103, and outputs a video signal to a superimpose unit 104. A display timing determination unit 109 provides instructions about the number of frames accumulated and held by the data buffer unit 102. The speaker 103 outputs sound in accordance with a sound signal from the data buffer unit 102.

The superimpose unit 104 superimposes graphics data acquired from a display data generation unit 110, to be described below, with video data acquired from the data buffer unit 102, and outputs a superimposed video signal to a display unit 105. The display unit 105 displays a video image in accordance with a video signal from the superimpose unit 104. An additional information acquisition unit 106 acquires the additional information from the content reception unit 101, and extracts object data and frame data. Object data represents relevant information about an object appearing on the content, and frame data represents the state where an object is displayed in each frame constituting video data. The additional information acquisition unit 106 outputs the extracted frame data to a display feature information calculation unit 107. Also, the additional information acquisition unit 106 receives instructions given by the display data generation unit 110, and outputs the corresponding object data to the display data generation unit 110.

FIG. 2A is a diagram illustrating an example of object data, and FIG. 2B is a diagram illustrating an example of frame data. The object data shown in the present example includes an ID number (object ID) unique to each object, and various kinds of information about an object. For example, in the case of a performer in a drama, relevant information about an object includes a name, a role name, main works, and the like. Also, for each frame of video, frame data includes information such as the object ID, the position, the size, and the like of the object included in video. In frame data exemplified in FIG. 2B, the frame ID is the ID unique to each video frame. Also, the object ID is identification information (object ID) about an object that appears on video of the corresponding frame ID. The depth Z indicates a display order when a plurality of objects overlaps. When the value of the depth Z is zero, an object is displayed on the frontmost side when viewed from a viewer, and other objects are displayed on the backmost side in accordance with an increase in numeral values. The x-axis coordinate and the y-axis coordinate indicate the position coordinates of a point located at the upper left of the display position of an object. The width and the height indicate the width and the height of an object, respectively. Note that a two-dimensional orthogonal coordinate system consisting of x-axis and y-axis is set, for example, such that x-axis is a horizontal axis and y-axis is a vertical axis by setting the predetermined position on the display screen as an origin.

A display control unit that controls the display timing of relevant information about an object is constituted by the display feature information calculation unit 107, a frame evaluation unit 108, to be described below, and the display timing determination unit 109. The display feature information calculation unit 107 acquires frame data from the additional information acquisition unit 106, acquires a video signal from the content reception unit 101, and calculates display feature information for each frame. The calculated display feature information is transmitted to the frame evaluation unit 108. Here, display feature information indicates the quantities for the features of the display state of an object of interest in a video frame, and includes information such as the display size of an object in a frame, and the like. The details of the above will be described below.

The frame evaluation unit 108 acquires display feature information from the display feature information calculation unit 107, determines whether or not the object is drawing attention in a video frame, and performs frame evaluation based on the determination result. The evaluation result is output to the display timing determination unit 109. Determination processing related to the degree of attention of objects in a video image will be described below.

The display timing determination unit 109 receives an evaluation result from the frame evaluation unit 108. The display timing determination unit 109 determines the timing at which displaying relevant information about an object is to be started, and provides instructions about the start of superimposition to the superimpose unit 104. Also, the display timing determination unit 109 provides instructions about the number of frames to be held to the data buffer unit 102 based on the number of frames required for determining the display timing.

Figure 3:
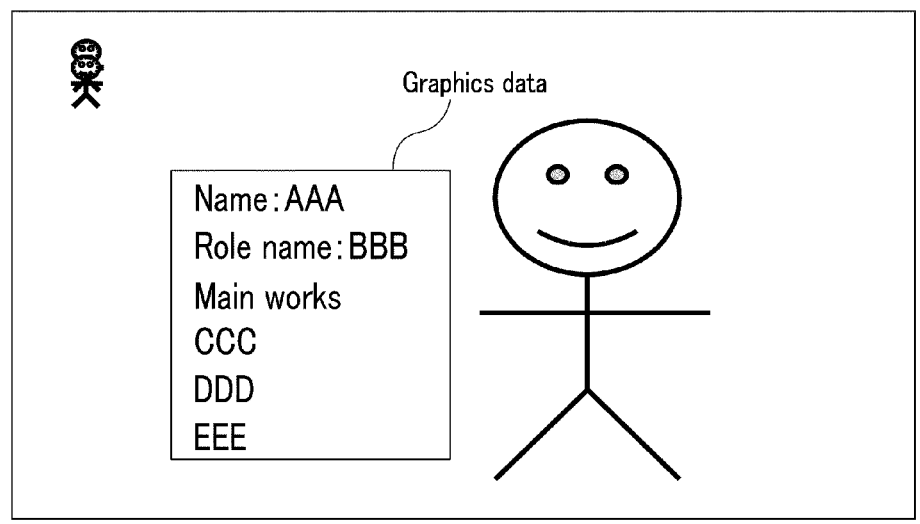
FIG. 3 is an explanatory diagram illustrating an example of graphics data of relevant information about an object.

The display data generation unit 110 acquires object data from the additional information acquisition unit 106, and generates graphics (user interface) data of object data to be displayed. FIG. 3 shows an example of graphics data. Graphics data is data that displays the name, the role name, and the like of the object acquired from object data. Note that an image analysis unit 902 shown in FIG. 1 and the meaning of numbers within the parentheses on the right side of the reference numerals 10, and 106 to 108 will be described below according to a second embodiment.

Figures 4, 5:
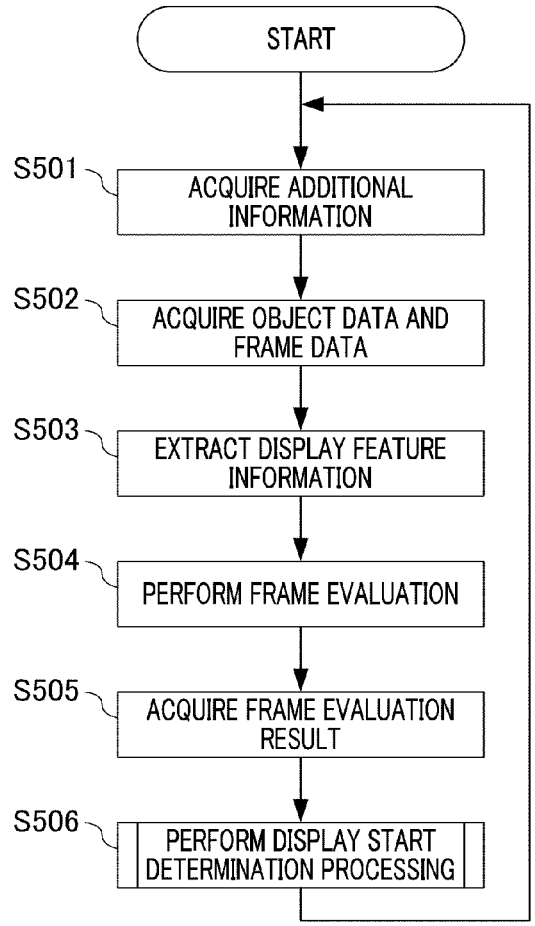
FIG. 4 is a flowchart illustrating an example of display timing determination processing for relevant information about an object.
FIG. 5 is a diagram illustrating an example of display feature information to be calculated based on frame data and a video signal.

Next, the flow of display timing determination processing for relevant information about an object will be described with reference to the flowchart shown in FIG. 4.

In step S501, the content reception unit 101 separates the additional information from the received content data, and transmits it to the additional information acquisition unit 106. Also, the content reception unit 101 decodes video sound data, and adds a frame ID to the processed data and outputs the resulting data to the data buffer unit 102. The data buffer unit 102 receives instructions about the number of frames for holding data from the display timing determination unit 109, holds data for the number of frames, outputs a video signal together with a frame ID to the superimpose unit 104, and outputs a sound signal to the speaker 103.

In step S502, the additional information acquisition unit 106 receives the additional information obtained from the content reception unit 101, and extracts object data and frame data. The additional information acquisition unit 106 transmits frame data to the display feature information calculation unit 107. In step S503, the display feature information calculation unit 107 calculates display feature information based on frame data and a video signal, and outputs the calculation result to the frame evaluation unit 108. Note that the details of display feature information calculation processing will be described below. In step S504, the frame evaluation unit 108 carries out frame evaluation for each object using the display feature information acquired from the display feature information calculation unit 107. When the reference result of display feature information determines that an object displayed in a video frame is the object of attention, the frame is evaluated as a frame suitable for the display of information relevant to the object. Hereinafter, whether or not displaying the frame evaluation result is proper is represented as "OK" when a frame is suitable for displaying relevant information and as "NG" when a frame is not suitable for displaying the same. The details of frame evaluation processing will be described below. Note that a frame having a frame ID of "X" is called as "frame X", a frame having an object ID of "Y" is called as "object Y". Each of the symbols X and Y represents a natural number.

In step S505, the display timing determination unit 109 acquires the frame evaluation result for each object, and the process advances to step S506. Here, the display timing determination unit 109 determines whether or not displaying relevant information for each object is to be started based on the frame evaluation result for each object. When the number of frames of which the frame evaluation results indicate "OK" extends continuously over the predetermined number of frames, the display timing determination unit 109 determines that displaying relevant information about an object is to be started. In this case, graphics data is displayed on a display screen as shown in FIG. 3. The details of determination processing for starting display of relevant information about an object will be described below.

Hereinafter, a description will be given of display feature information calculation processing. A method for calculating display feature information about the frame 1 will be specifically described with reference to object data and frame data shown in FIGS. 2A and 2B. FIG. 5 is a diagram illustrating an example of the display feature information about the calculated frame ID "1". The display feature information calculation unit 107 calculates display feature information for each object. The display feature information of the present example includes items such as an object size, the distance from the center of a screen, a motion amount, an overlap region size, brightness, and the face direction of an object.

The object size is the size of an object on a display screen, and specifically, is an area that is calculated using information about the width and the height of frame data. The distance (r) from the center of a screen is a distance between the center coordinate of a display screen and the center coordinate of an object. The motion amount represents a change in the position of an object on a screen, and is the amount of displacement of an object between frames, i.e., between the previous frame and the present frame. The overlap region size represents the size of an overlapped area when another object is displayed in front of the object so as to overlap the display area of the object. When the depth Z is zero, such object is displayed on the frontmost side of a video image, and thus the overlap region size becomes zero. When the depth Z is equal to or greater than 1, the area of the region overlapping the object displayed in the foreground is calculated using the x-axis coordinate, the y-axis coordinate, the width, and the height of each object. The area becomes an overlap region size. For example, in the case of an object 3 shown in FIGS. 2A, 2B, and 5, the depth Z of the frame ID 1 is 1 and thus the object 3 overlaps an object 2. Consequently, the overlap region size becomes 6000.

Brightness is calculated by cutting out the region at which an object is displayed from the entire video region, and computing the average value of the brightness of the pixels of an image in the cut-out region. For the face direction of an object, the display feature information calculation unit 107 cuts out the region at which an object is displayed from the entire video region, and determines whether or not the face of the object looks toward the front from the image in the cut-out region. When it is determined that the face looks toward the front, the numeral value indicating the determination result becomes "one", and the numeral value becomes zero in other cases (a face region is absent or the face does not look toward the front). The face direction of an object can be determined by a known technique. For example, a plurality of face direction detection regions is set around the periphery of the face region at which a face exists, and the quantities for the features is acquired for each face direction detection region for comparison, whereby the face direction can be detected.

While in the present example, processing for calculating six display feature information items in total has been described, several display feature information may be calculated selectively, and the type of display feature information is not limited. Other types of information may further be employed as long as information indicates the display state of an object in a video frame.

Next, frame evaluation processing will be described. In the present processing, the frame evaluation unit 108 evaluates a frame based on the acquired display feature information. The frame evaluation result is an index indicating whether or not an object to be evaluated is being displayed so as to draw attention in a video frame. Hereinafter, a frame evaluation method will be specifically described with reference to display feature information shown in FIG. 5.

When all of the determination conditions shown in the following evaluation criteria 1 to 8 are satisfied, the frame evaluation unit 108 determines that a frame to be evaluated is suitable for displaying relevant information about an object to be evaluated and thus the frame evaluation result is "OK".

1. The object size lies within a preset range (the acceptable range is from 100000 to 1500000 including an upper-limit threshold value and a lower-limit threshold value).
2. The distance from the center of a screen is less than a threshold value (threshold value is 700).
3. The motion amount is less than a threshold value (threshold value is 3).
4. The proportion of the overlap region size with respect to the object size is equal to or less than x in percentage that is a determination criteria (x=50).
5. The brightness is equal to or greater than a threshold value (threshold value is 100).
6. The face direction looks to the front (the numeral value of the determination result is 1).
7. The number of other objects that are present in an identical frame is equal to or less than a threshold value (threshold value is 3).
8. The size of an object to be evaluated is larger than the sizes of other objects that are present in an identical frame.

Note that the numeral values within the parentheses are illustratively shown as reference values in the present embodiment.

A description will be given of determination processing for each object relative to the frame 1 by taking display feature information shown in FIG. 5 as an example. Determination processing is carried out as follows. First, an object 1 satisfies all of the evaluation criteria 1 to 8. The frame evaluation unit 108 determines that the frame 1 is suitable for displaying relevant information about the object 1 (determination result is "OK"). The object 2 does not satisfy the evaluation criteria 1, 2, and 8. Therefore, the frame evaluation unit 108 determines that the frame 1 is not suitable for displaying relevant information about the object 2 (determination result is "NG"). The object 3 does not satisfy the evaluation criteria 1, 2, 4, 6, and 8, and then the frame evaluation unit 108 determines that the frame 1 is not suitable for displaying relevant information about the object 3 (determination result is "NG").

While in the present embodiment, frame evaluation is performed using the determination conditions of predetermined evaluation criteria 1 to 8 related to the degree of attention of an object in a frame, the present invention is not limited thereto, and each evaluation criterion may be utilized selectively. Also, while the evaluation criterion 8 determines the relative size between a first objected to be evaluated and other second object in the same frame, evaluation criteria related to display feature information other than the aforementioned specific example may also be employed and are not intended to limit an evaluation method.

Next, processing shown in step S506 in FIG. 4 (display start determination processing for each object) will be described in accordance with the flowchart shown in FIG. 6.

Before describing the steps, frame count management information (hereinafter referred to as "FC management information") used for display start determination processing will now be described. FIG. 7 illustrates FC management information for each object. The object ID is the object ID of an object of interest. The frame count start frame ID is the frame ID of a frame for which the frame evaluation is changed from "NG" to "OK" and thus a frame count is started (hereinafter simply referred to as "start frame ID"). The frame count value is the number of frames in which the frame evaluation results are "OK" continuously from the frame from which a frame count is started. The display history indicates the frame ID of a frame when relevant information about an object of interest has previously been displayed.

Figure 6:
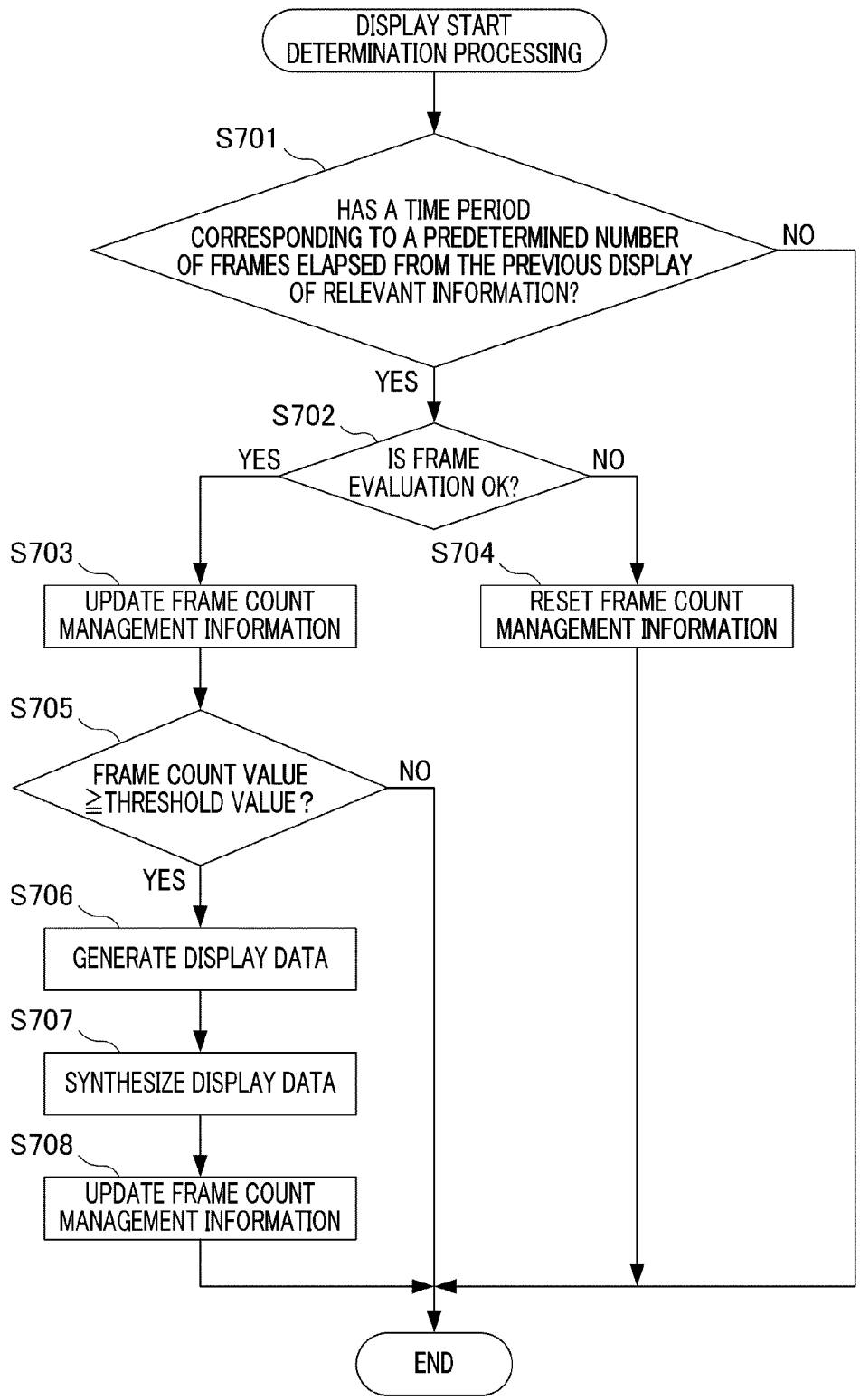
FIG. 6 is a flowchart illustrating an exemplary flow of display start determination processing for relevant information.

In step S701 shown in FIG. 6, the display timing determination unit 109 refers to the display history of an object of interest from FC management information, and determines whether or not a time period corresponding to a predetermined number of frames has elapsed from the frame which had displayed relevant information about the object in the past. A time period corresponding to a predetermined number of frames is set in advance. When the time period has not elapsed, the process is ended. With this arrangement, once relevant information about an object is displayed, relevant information can be displayed again after a lapse of a predetermined time period.

In step S701, when a time period corresponding to a predetermined number of frames has elapsed from the previous display point or when relevant information about an object of interest has never been displayed, the process advances to step S702. Here, the display timing determination unit 109 determines whether the frame evaluation result of an object is "OK" or "NG". When the frame evaluation result is "OK", the process advances to step S703, and the display timing determination unit 109 adds the frame count value of an object of interest. When a frame count is started from the frame (i.e., when the frame count value is 1), the display timing determination unit 109 stores the frame ID at the present moment, at which the addition of a frame count is started, as the information about a start frame ID. On the other hand, when the frame evaluation result is "NG", the process advances to step S704. Here, the display timing determination unit 109 resets the frame count value and the start frame ID of an object of interest in FC management information, and the process is ended.

In step S705 subsequent to step S703, the display timing determination unit 109 refers to FC management information, and determines whether or not the frame count value of an object of interest is equal to or greater than a threshold value. A threshold value is, for example, 300 frames (if content is 60 frames/sec, the frames are five-second worth of data). When the frame count value is less than a threshold value, the process is ended, whereas when the frame count value is equal to or greater than a threshold value, the process advances to step S706. Here, the display timing determination unit 109 provides instructions to the display data generation unit 110 about the generation of display data related to relevant information about an object of interest. The display data generation unit 110 acquires object data related to an object of interest from the additional information acquisition unit 106, and generates graphics data.

In step S707, the display timing determination unit 109 reports an object ID and a superimpose start frame ID to the superimpose unit 104. Here, the superimpose start frame ID is the start frame ID of the aforementioned frame count. The superimpose unit 104 acquires graphics data corresponding to the reported object ID from the display data generation unit 110. The acquired graphics data is superimposed with video data in the timing of displaying video having the frame ID as the reported superimpose start frame ID, and the resulting data is displayed.

In step S708, the display timing determination unit 109 updates FC management information. Among FC management information, the superimpose start frame ID, which indicates the time point at which a request for the start of displaying relevant information about an object has been made, is stored in the display history of an object of interest. After performing step S704 or step S708, or when the determination result obtained in step S701 or step S705 is NO, a series of processing described above is ended.

According to the first embodiment, it is determined whether or not an object is being displayed on a screen in a state suitable for displaying relevant information about the object, whereby relevant information about the object may be displayed based on the determination result. In other words, relevant information about an object is displayed in the timing at which the object in a video image is drawing attention based on the display state of the object that appears in the video image. A viewer can view relevant information about an object at the appropriate timing, and thus can readily grasp the object and its relevant information.

Second Embodiment

Next, a second embodiment of the present invention will be described. A video image processing apparatus 20 according to the second embodiment adds relevant information as the additional information to an object with respect to the acquired content data, and, when an object to which relevant information has been added appears, controls the timing at which relevant information is displayed. For example, it is assumed that for a user may set relevant information, such as the name of a person or the like, in an apparatus a personal content data captured by the user. The difference between this apparatus and the apparatus according to the first embodiment is the operation of an image analysis unit 902 shown in FIG. 1 and the components relating to the analysis unit. Thus, the following description will be focused on such differences. A description will be given by focusing on such differences between this embodiment and the first embodiment. The components that are identical to those shown in the first embodiment are given the same reference numerals, and the detailed explanation thereof will be omitted.

A content reception unit 901 separates a video-sound signal from the received content data, decodes the video-sound signal to output it to an image analysis unit 902 and the data buffer unit 102. Also, the content reception unit 901 determines whether or not object data and frame data have been added to the received content data. When object data and frame data have been added to content data, the separated additional information is output to an additional information acquisition unit 903, and the video-sound signal is output to the data buffer unit 102. When object data and frame data have not been added to content data, the video signal is output to the image analysis unit 902. Content data includes video/sound information, and examples of content data include data in a file format according to MPEG2-TS or AVCHD, and the like. AVCHD is an abbreviation for "Advanced Video Codec High Definition".

The image analysis unit 902 receives the video-sound signal for content from the content reception unit 901, performs image analysis, and generates object data and frame data for the content. These data are transmitted to the additional information acquisition unit 903. Also, a video-sound signal is correlated with a frame ID and then output to the data buffer unit 102.

The additional information acquisition unit 903 receives the additional information from the content reception unit 901, and extracts object data and frame data. Alternatively, the additional information acquisition unit 903 acquires object data and frame data from the image analysis unit 902. Then, the additional information acquisition unit 903 outputs frame data to a display feature information calculation unit 904 and outputs object data to the display data generation unit 110.

The display feature information calculation unit 904 calculates display feature information based on the frame data acquired from the additional information acquisition unit 903. The calculated display feature information is transmitted to a frame evaluation unit 905. In display feature information calculation processing, only display feature information, which can be calculated, is calculated in accordance with information included in frame data.

The frame evaluation unit 905 acquires display feature information from the display feature information calculation unit 904, and determines whether or not an object is drawing attention in a video frame. The frame evaluation unit 905 performs frame evaluation based on the determination result, and outputs the frame evaluation result to the display timing determination unit 109. The frame evaluation unit 905 selects frame evaluation criteria in response to the acquired display feature information.

Figure 8:
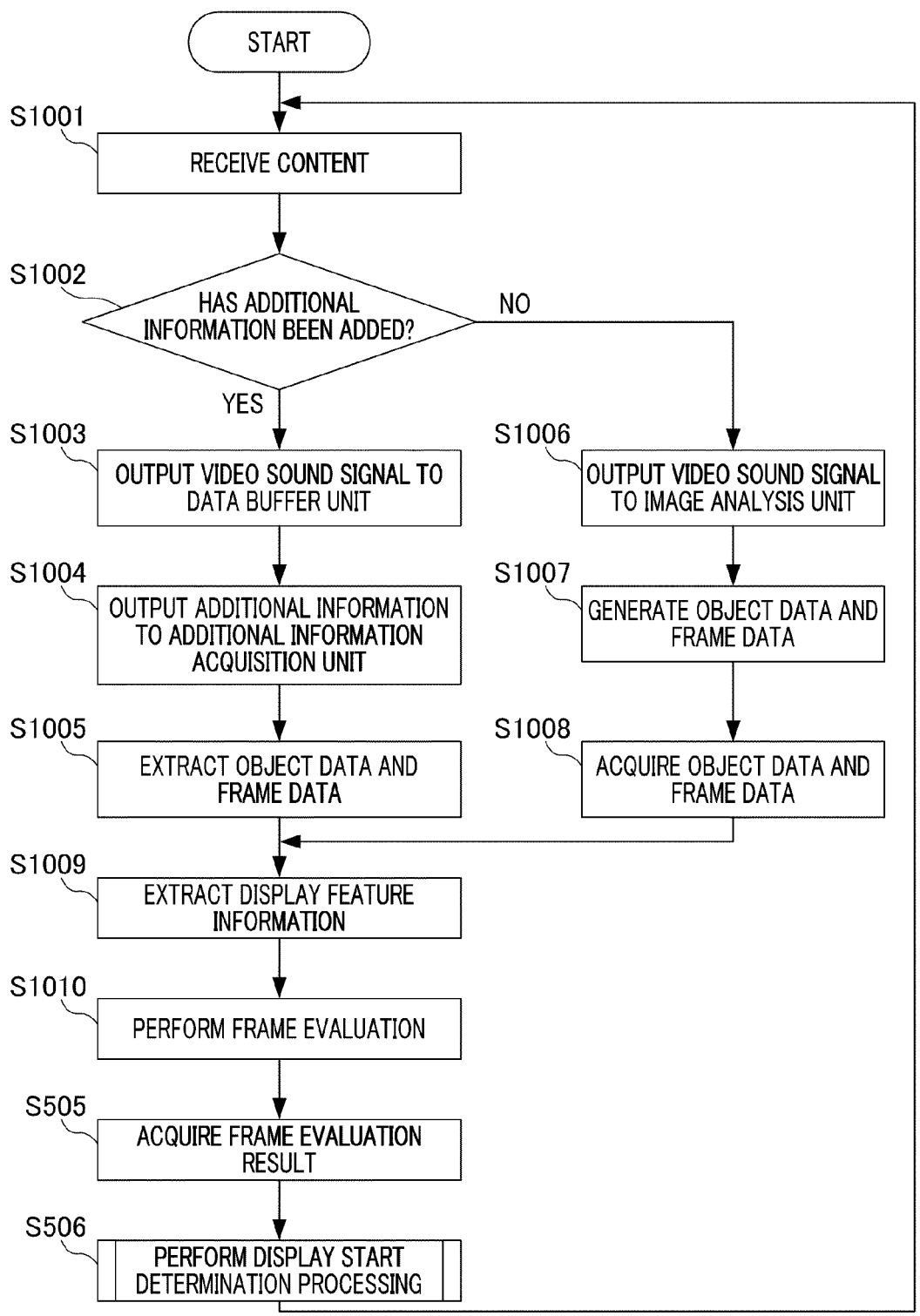
FIG. 8 is a flowchart illustrating an exemplary flow of display timing determination processing for relevant information about an object for explaining a second embodiment of the present invention in conjunction with FIG. 9.

Next, timing determination processing for displaying relevant information about an object will be described in accordance with the flowchart shown in FIG. 8. Hereinafter, a description will be given of processing in steps S1001 to S1010 that are different from those shown in FIG. 4.

In step S1001, the content reception unit 901 receives content data. In step S1002, the content reception unit 901 analyzes the received content data, and determines whether or not object data and frame data have been added to the received content data. When object data and frame data have been added thereto, the process advances to step S1003, whereas when these data have not been added thereto, the process advances to step S1006.

In step S1003, the content reception unit 901 decodes video sound data, adds a frame ID thereto, and outputs the resulting data to the data buffer unit 102. In step S1004, the content reception unit 901 outputs the additional information to the additional information acquisition unit 903. In step S1005, the additional information acquisition unit 903 extracts object data and frame data from the acquired additional information, and outputs frame data to the display feature information calculation unit 904.

In step S1006, the content reception unit 901 outputs a video-sound signal to the image analysis unit 902. In step S1007, the image analysis unit 902 receives the video-sound signal for content from the content reception unit 901 to perform image analysis, and then generates the object data and the frame data of the content. Also, the image analysis unit 902 adds a frame ID to the video-sound signal, and outputs the resulting signal to the data buffer unit 102. In step S1008, the image analysis unit 902 outputs object data and frame data to the additional information acquisition unit 903. The additional information acquisition unit 903 outputs the acquired frame data to the display feature information calculation unit 904.

In step S1009, the display feature information calculation unit 904 acquires frame data from the additional information acquisition unit 903, and acquires a video signal from the content reception unit 901. The display feature information calculation unit 904 calculates display feature information using the acquired frame data and video signal. The display feature information calculation processing will be described below.

In step S1010, the frame evaluation unit 905 performs frame evaluation for each object using the display feature information acquired from the display feature information calculation unit 904. The evaluation criteria are selected based on display feature information, and then frame evaluation processing is carried out. The details of frame evaluation processing will be described below. Then, the process advances to step S505 and S506.

Next, display feature information calculation processing will be described. While a display feature information calculation method is the similar to that described in the first embodiment, the display feature information calculation unit 904 calculates only display feature information, which can be calculated, based on the frame data acquired from the additional information acquisition unit 903. More specifically, among the display feature information listed in the first embodiment such as an object size, the distance from the center of a screen, a motion amount, overlap region size, brightness, and face direction, only information, which can be calculated, is to be processed.

FIG. 9A is a diagram illustrating an example of frame data, and FIG. 9B is a diagram illustrating an example of display feature information relating to the frame ID 1, which has been calculated by the display feature information calculation unit 904. In FIG. 9A, information about the depth Z is absent in the frame 1. Thus, the display feature information calculation unit 904 calculates the overlap region size as an invalid value. Also, when the face direction cannot be determined in processing for calculating the face direction from a video signal, that information is calculated as an invalid value. In the display feature information relating to the frame 1 shown in FIG. 9B, the information about the overlap region size and the information about the face direction are invalid values (see "-").

In this manner, if display feature information, which cannot be calculated from frame data or a video signal, is an invalid value, display feature information can be calculated even when the configurations of frame data are different. For example, exemplary cases include the case when the configuration of frame data to be added to broadcast wave is different from that of frame data obtained by the analysis performed by the video image processing apparatus, the case when content, in which the configuration of the added frame data is different depending on the frame, is received, or the like.

Next, frame evaluation processing will be described. While a frame evaluation method is similar to that described in the first embodiment, the frame evaluation unit 905 selects a frame evaluation criteria for each frame based on the display feature information acquired from the display feature information calculation unit 904.

Hereinafter, a frame evaluation method will be specifically described using display feature information shown in FIG. 9B. In the frame 1, overlap region size and face direction among display feature information are invalid values. Also, in the frame 1, only one object is present. Thus, the frame evaluation unit 905 determines whether or not the frame 1 satisfies all of the remaining evaluation criteria excluding the aforementioned evaluation criteria 4, 6, and 8 to thereby perform frame evaluation. In this manner, frame evaluation criteria are changed for each frame based on display feature information, whereby frame evaluation can be performed even when the content of display feature information is different depending on the frame.

While, in the present example, the additional information is generated by providing the image analysis unit 902 in the video image processing apparatus 20, the same processing as described above can be realized by providing an interface unit that acquires all or a part of the additional information from an external server or the like connected through a network.

According to the second embodiment, the additional information is generated in the apparatus even when the additional information has not been added to the received content. Then, when it has been determined in accordance with predetermined evaluation criteria that an object of interest is being displayed as an object of attention in a video image, relevant information about the object is displayed.

Third Embodiment

Figure 10:
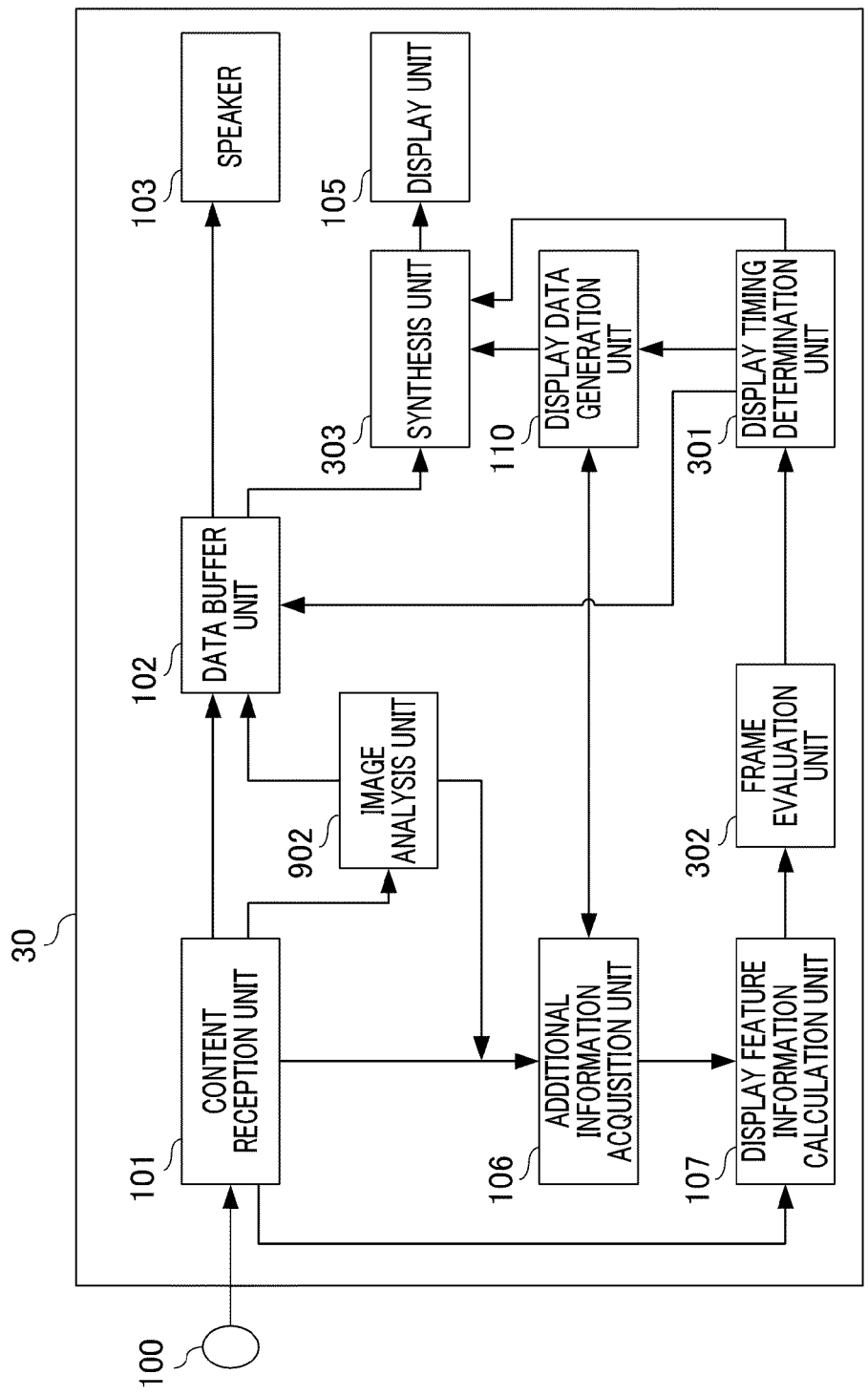
FIG. 10 is a block diagram illustrating an example of the schematic configuration of an apparatus for explaining a third embodiment of the present invention in conjunction with FIGS. 11 to 13.

Next, a third embodiment of the present invention will now be described. FIG. 10 is a diagram illustrating an example of the configuration of a video image processing apparatus 30 according to a third embodiment. The apparatus controls not only the display start timing of relevant information about an object described in the first embodiment, but also the display end timing thereof. The main difference between the video image processing apparatus of the present embodiment and the video image processing apparatus 10 according to the first embodiment is the operation of a display timing determination unit 301, a frame evaluation unit 302, and a superimpose unit 303 shown in FIG. 10. A description will be given by focusing on such a difference between the present embodiment and the first embodiment. The components that are identical to those shown in the first embodiment are given the same reference numerals, and the detailed explanation thereof will be omitted.

In addition to the operation described in the first embodiment, the display timing determination unit 301 reports the ID number (display start frame number) of the determined display start frame to the frame evaluation unit 302 and the superimpose unit 303. The frame evaluation unit 302 transmits frame evaluation values for a plurality of frames, which have been preset from the reported display start frame, to the display timing determination unit 301. The display timing determination unit 301 determines the number of display frames for relevant information about the object in response to the frame evaluation values transmitted from the frame evaluation unit 302, and reports it to the superimpose unit 303. The superimpose unit 303 starts and ends superimpose processing for relevant information about the object in accordance with the display start frame number and the number of display frames which have been reported from the display timing determination unit 301.

Figure 11:
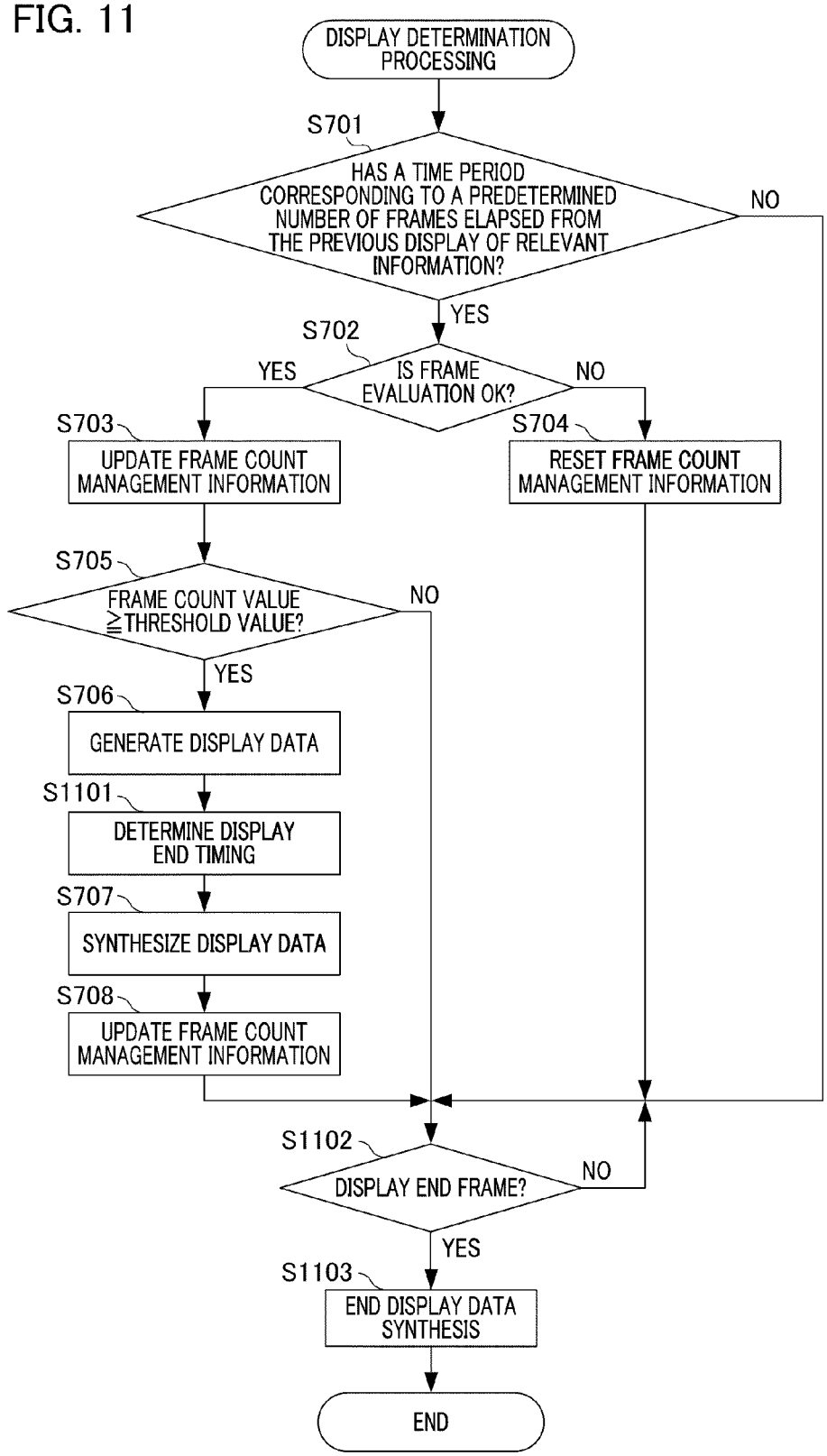
FIG. 11 is a flowchart illustrating an exemplary flow of determination processing for determining the display start and the display end of relevant information.

Hereinafter, processing for determining the number of display frames by the display timing determination unit 301 will now be described with reference to the flowchart shown in FIG. 11. Here, a description will be given of the processes in steps S1101 to S1103 that are different from the processes in FIG. 6 described in the first embodiment.

In step S1101 subsequent to step S706, the display timing determination unit 301 reports the display start frame number to the frame evaluation unit 302. From the reported display start frame, the frame evaluation unit 302 transmits the frame evaluation value for 1200 frames (e.g., if content is 60 frames/sec, the frames are twenty-second worth of data) to the display timing determination unit 301. The display timing determination unit 301 determines the number of display frames depending on the frame evaluation value, and reports the number of display frames to the superimpose unit 303. The details of a method for determining the number of display frames will be described below. Furthermore, the superimpose unit 303 calculates the display end frame number from the display start frame number and the number of display frames that have been reported from the display timing determination unit 301. For example, when the display start frame number is 2000 and the number of display frames is 300, the display end frame number becomes 2000+300=2300. After step S1101, the process advances to step S707.

When the determination result is "NO" after step S704 or step S708, or in step S701 or step S705, the process advances to step S1102. In step S1102, the superimpose unit 303 determines whether or not the current display frame number coincides with the display end frame number calculated in step S1101. When the current display frame number does not coincide with the display end frame number, determination in S1102 is repeatedly executed in the next display frame. When the current display frame number coincides with the display end frame number, the process advances to step S1103, and the superimpose unit 303 stops processing for synthesizing display data relating to relevant information about an object.

Next, a method for determining the number of display frames depending on the frame evaluation value will be described in detail. The frame evaluation unit 302 performs frame total evaluation using the following five items. Here, among the items described in the first embodiment, the evaluation items suitable for determining the number of display frames are extracted for usage.

1. The size of an object (the larger the size, the higher the evaluation value is set).
2. The distance from the center of the screen of an object (the smaller the distance, the higher the evaluation value is set).
3. The motion amount of an object (the smaller the motion amount, the higher the evaluation value is set).
4. The brightness of an object (when the brightness value is an intermediate, the evaluation value is set to the highest).
5. The number of other objects present in the same frame as that of an object of interest (the fewer the objects, the higher the evaluation value is set).

The frame evaluation unit 302 calculates the average value of the aforementioned five items, and determines the total evaluation value of the frame.

FIG. 12A is a diagram illustrating an example of evaluation values for each frame evaluation item and a frame total evaluation value to be calculated by the frame evaluation unit 302. In the present example, the frame evaluation items are set to the aforementioned five items, and the frame total evaluation value is determined as the average value of the five items. This is an exemplary calculation method. The evaluation items may be utilized selectively including the evaluation items described in the first embodiment. Also, while a simple average value is employed for the calculation of the frame total evaluation value, a particular item(s) may be weighted to obtain an average, and the evaluation value calculation method is not intended to be limited.

The display timing determination unit 301 determines the number of display frames for relevant information about an object depending on the frame total evaluation value calculated by the frame evaluation unit 302, and reports it to the superimpose unit 303. FIG. 12 B is a diagram illustrating an example of a determination table showing the number of display frames depending on the frame total evaluation value. The higher the frame total evaluation value, the higher the number of display frames for relevant information about an object is set. Also, the display timing determination unit 301 compares a frame total evaluation value with a set threshold value within a display period of relevant information about an object. When a frame having a frame total evaluation value smaller than a set threshold value is present, the display timing determination unit 301 determines that displaying relevant information about an object should be stopped at the frame, calculates the number of frames up until the frame, and reports it to the superimpose unit 303.

Figure 13A:
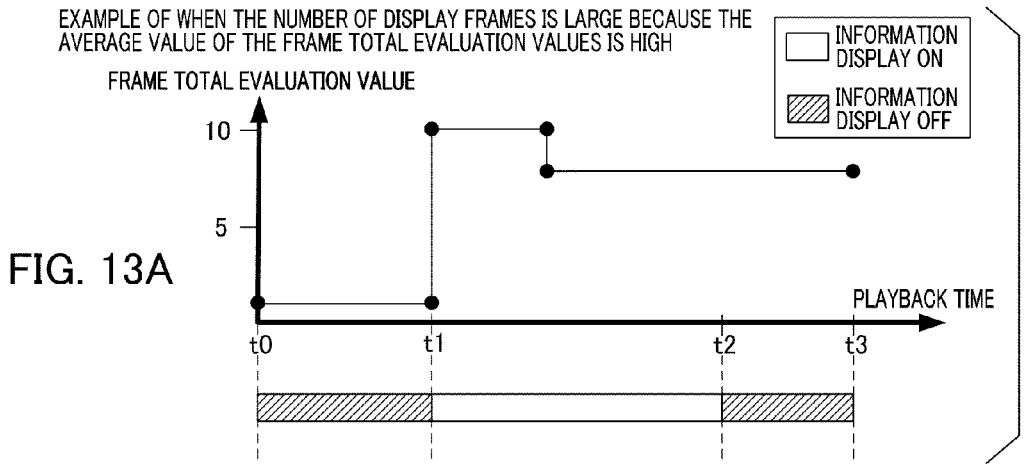
FIG. 13A is a diagram illustrating an example when the number of object display frames is large.
Figure 13B:
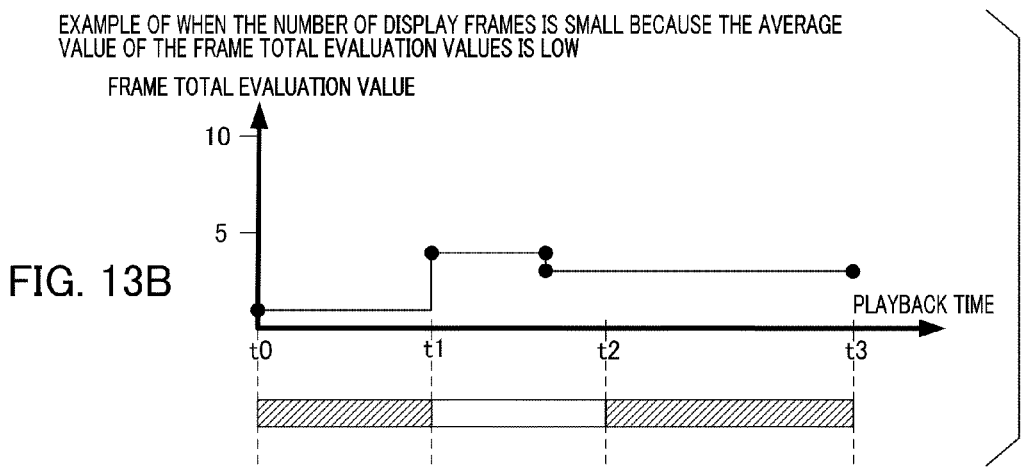
FIG. 13B is a diagram illustrating an example when the number of object display frames is small.
Figure 13C:
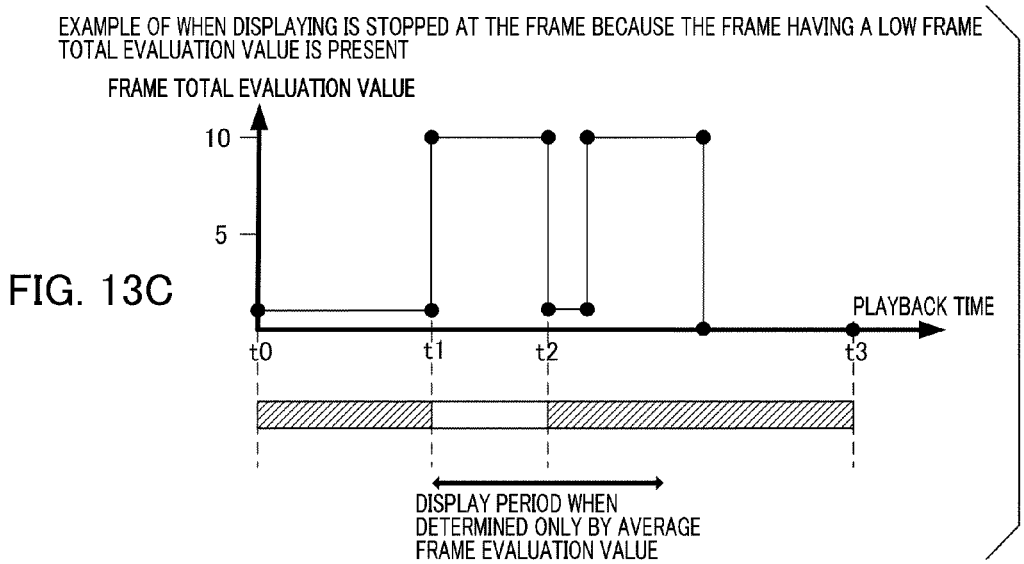
FIG. 13C is a diagram illustrating an example when the display of relevant information about an object is stopped.

Each of FIGS. 13A to 13C is a timeline diagram illustrating the relationship between a frame total evaluation value and the number of display frames for an object. The vertical axis indicates a frame total evaluation value (from 0 to 10), and the horizontal axis indicates a content playback time (unit: sec). Also, among the strip-like display section under the graph, a time period (see the time from t1 to t2) shown in a white color is a time period during which relevant information about an object is displayed, and a time period (see the time from t0 to t1, and the time from t2 to t3) shown by hatching is a time period during which relevant information about an object is not displayed. FIG. 13A is a diagram illustrating an example when the number of display frames for relevant information about an object is large because the average value of the frame total evaluation values is high. FIG. 13B is a diagram illustrating an example when the number of display frames for relevant information about an object is small because the average value of the frame total evaluation values is low. In FIG. 13B, the length of the display period shown by the time from t1 to t2 is short. FIG. 13 C is a diagram illustrating an example when display of relevant information about an object is stopped at the time point of the frame of which the frame total evaluation value becomes lower than a threshold value.

As described above, according to the third embodiment, not only the display start timing but also the display end timing of relevant information about an object cay be appropriately controlled depending on the evaluation value of the display state of an object.

Fourth Embodiment

Figure 14:
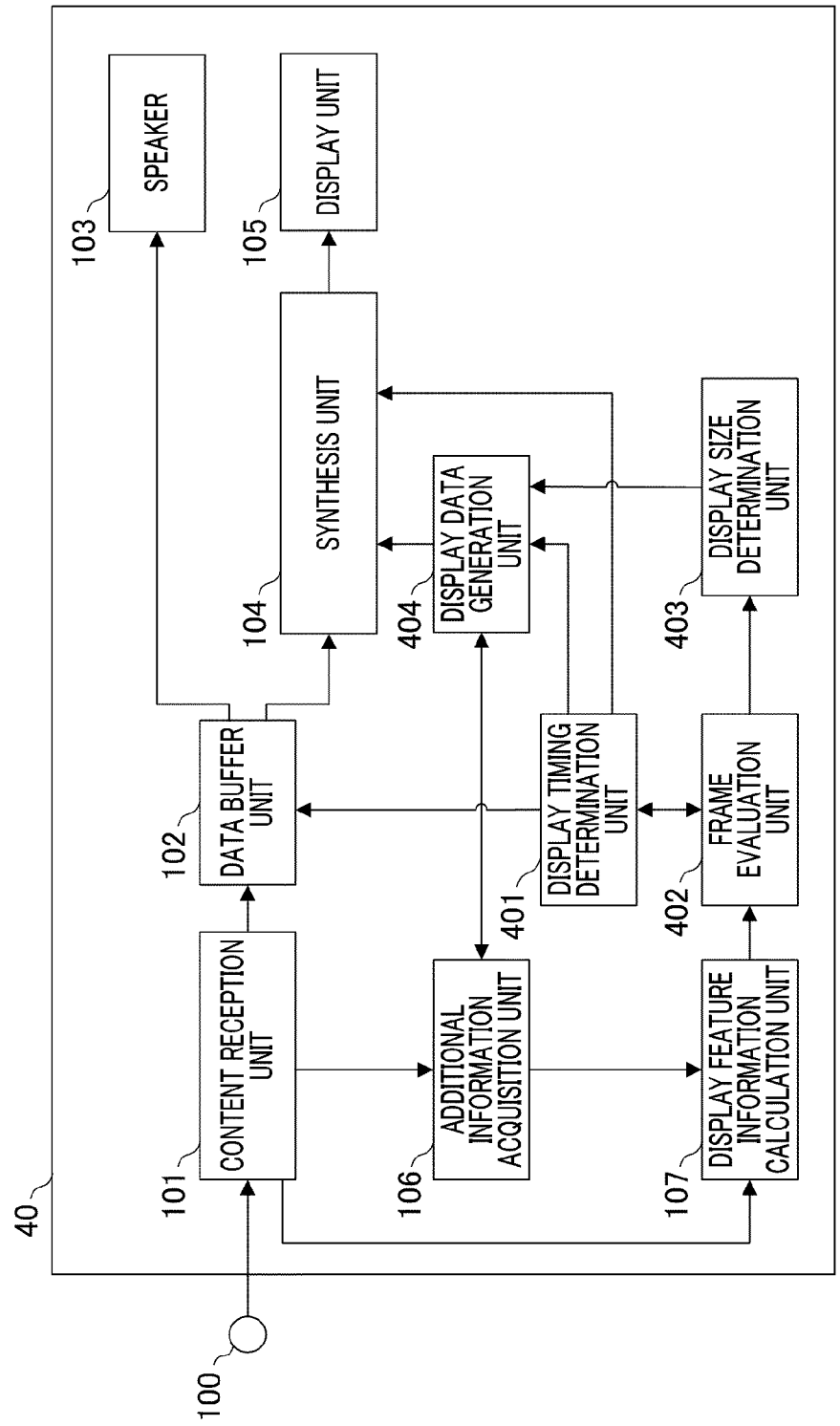
FIG. 14 is a block diagram illustrating an example of the schematic configuration of an apparatus for explaining a fourth embodiment of the present invention in conjunction with FIGS. 15 to 17.

Next, a fourth embodiment of the present invention will be described. FIG. 14 is a block diagram illustrating an example of the configuration of a video image processing apparatus 40 according to a fourth embodiment. The apparatus controls the display size and the display information amount in addition to the display start timing of relevant information about an object described in the first embodiment. The difference between the video image processing apparatus of the present embodiment and the video image processing apparatus 10 according to the first embodiment is the operation of a display timing determination unit 401, a frame evaluation unit 402, a display size determination unit 403, and a display data generation unit 404 shown in FIG. 14. A description will be given by focusing on such a difference from the first embodiment. The components that are identical to those shown in the first embodiment are given the same reference numerals, and the detailed explanation thereof will be omitted.

The display timing determination unit 401 reports the display start frame number to the frame evaluation unit 402. The frame evaluation unit 402 transmits the frame evaluation values for a plurality of frames starting from the reported display start frame to the display size determination unit 403. The display size determination unit 403 determines the display size (display character size and display information amount) of relevant information about the object depending on the frame evaluation values transmitted from the frame evaluation unit 402, and reports display size information to the display data generation unit 404. The display data generation unit 404 generates display data for relevant information about an object depending on the reported display size information, and transmits it to the superimpose unit 104.

Figure 15:
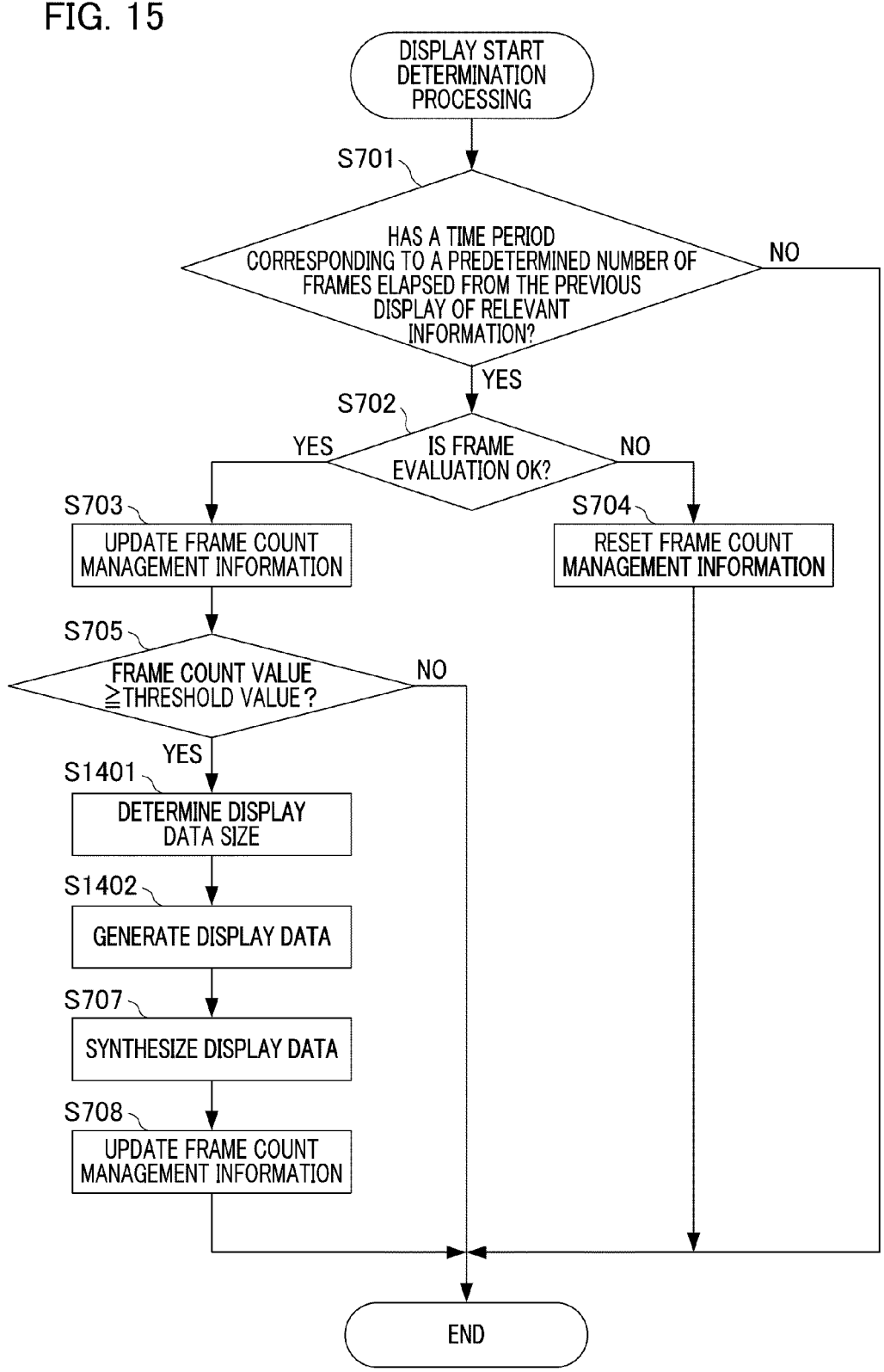
FIG. 15 is a flowchart illustrating display size determination processing for relevant information.

Next, display size determination processing performed by the display size determination unit 403 will now be described with reference to the flowchart shown in FIG. 15. Here, a description will be given of the processes in steps S1401 and S1402 that differ from the processes in FIG. 6 described in the first embodiment.

In step S1401 subsequent to step S705 (determination result: YES), the frame evaluation unit 402 transmits the frame evaluation values for a plurality of frames starting from the display start frame to the display size determination unit 403. The display size determination unit 403 determines the display size depending on the frame evaluation value, and reports display size information to the display data generation unit 404. In step S1402, the display data generation unit 404 generates display data for relevant information about an object based on the reported display size information, and transmits it to the superimpose unit 104. Then, the process advances to step S707.

Next, a display size determination method corresponding to a frame evaluation value will be described in detail. The frame evaluation unit 402 calculates a frame evaluation value as in the method described in the third embodiment, and transmits the frame total evaluation values for a plurality of preset frames starting from the display start frame to the display size determination unit 403. The items to be utilized for total evaluation are the same as those described in the third embodiment. This is an exemplary calculation method. The evaluation items may be utilized selectively including the evaluation items described in the first embodiment. Also, while a simple average value is employed for the calculation of the frame total evaluation value, a particular item(s) may be weighted to obtain an average, and the evaluation value calculation method is not intended to be limited.

The display size determination unit 403 determines the display size using the frame total evaluation values for a plurality of frames. Display size determination processing is performed based on the following four criteria.

1. The higher the average value of the frame total evaluation values, the larger the character size is set.
2. The higher the average value of the frame total evaluation values, the higher the number of characters is set.
3. The higher the average value of the frame total evaluation values, the more the information items is set.
4. The character size, the number of characters, and an information amount are determined in combination with the aforementioned criteria 1, 2, and 3.

FIG. 16A is a diagram illustrating an example of a reference table to be used for determining a character size. FIG. 16B is a diagram illustrating an example of a reference table to be used for determining the number of characters. FIG. 16C is a diagram illustrating an example of a table to be used for determining an information item(s).

Also, FIG. 17 is a diagram illustrating an example of a display screen when the display size and the display content of relevant information are changed depending on an object. In the present example, since the average value of the frame total evaluation values is high for the person object located at the center of the screen, the character size of relevant information is large and the number of items is increased. On the other hand, since the average value of the frame total evaluation values is low for the person object located at near the end of the screen, the character size of relevant information is small and the number of items is decreased.

As described above, according to the fourth embodiment, the size and the information amount of display data may be changed in accordance with the frame total evaluation value of an object, whereby appropriate information may be displayed depending on the importance of an object.

While in the present embodiment, the display size determination unit 403 controls the display size and the display information amount, the present invention is not limited thereto, but a display size determination unit and a display information amount determination unit may be provided in a separate manner.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-087850 filed Apr. 6, 2010, and Japanese Patent Application No. 2011-013263 filed Jan. 25, 2011 which are hereby incorporated by reference herein in their entirety.

What is claimed is:

1. A video image processing apparatus that performs display control of relevant information about an object included in video data, the video image processing apparatus comprising:
   an acquisition unit configured to acquire the relevant information about the object included in the video data;
   a frame evaluation unit configured to determine whether or not each frame satisfies an evaluation criteria based on a display state of an object in the each frame constituting the video data to thereby perform a frame evaluation; and
   a display timing determination unit configured to determine to start displaying relevant information about the object when the display timing determination unit determines that the number of frames satisfying the evaluation criteria extends continuously over a threshold value as the result of the frame evaluation by the frame evaluation unit,
   wherein the display timing determination unit does not determine to start displaying relevant information about the object even when there is one or more frame satisfying the evaluation criteria when the number of frames satisfying the evaluation criteria does not extend continuously over a threshold value as the result of the frame evaluation by the frame evaluation unit.

2. The video image processing apparatus according to claim 1, further comprising:
   a generation unit configured to generate graphics data for displaying relevant information about the object based on the relevant information acquired by the acquisition unit.

3. The video image processing apparatus according to claim 1, wherein the frame evaluation unit determines whether or not a target frame satisfies the evaluation criteria based on any one or more selected from a size of an object in the target frame, a display position, a motion amount between frames, brightness, and a face direction of the object.

4. The video image processing apparatus according to claim 1, wherein the frame evaluation unit determines that the target frame satisfies the evaluation criteria when the number of objects to be displayed within the target frame is equal to or less than a threshold value.

5. The video image processing apparatus according to claim 1, wherein the frame evaluation unit adopts a relative size between a first object and other second object to be evaluated as the evaluation criteria, and determines whether or not the size of the first object in an identical frame is larger than the size of the second object.

6. The video image processing apparatus according to claim 1, wherein the display timing determination unit determines to display the relevant information for longer time for the object in the frame with higher evaluation value based on the result of the frame evaluation by the frame evaluation unit.

7. The video image processing apparatus according to claim 1, further comprising:
a display size determination unit configured to determine a display size of relevant information about the object by acquiring the result of the frame evaluation by the frame evaluation unit,
wherein the display size determination unit determines to set larger display size of the relevant information for the object in the frame with higher frame evaluation value.

8. The video image processing apparatus according to claim 1, further comprising:
a display information amount determination unit configured to determine the display information amount of relevant information about the object by acquiring the result of the frame evaluation by the frame evaluation unit,
wherein the display information amount determination unit determines to set larger volume of display information of the relevant information for the object in the frame with higher frame evaluation value.

9. The video image processing apparatus according to claim 1,
wherein the display timing determination unit refers to a display history of the relevant information of the object, and
wherein the display timing determination unit does not determine to start displaying relevant information about the object even when the number of frames satisfying the evaluation criteria extends continuously over the threshold when a predetermined time does not elapsed from the time when the relevant information of a same object was displayed in the past.

10. The video image processing apparatus according to claim 2, further comprising:
a buffer unit configured to hold the video data for a certain period of time; and
a superimpose unit configured to superimpose graphics data generated by the generation unit to the video data hold for the certain period of time by the buffer unit,
wherein display of the relevant information about the object is started from a first frame which satisfies the evaluation criteria.

11. A video image processing method to be executed to a video image processing apparatus that performs display control of relevant information about an object included in video data, the video image processing method comprising:
acquiring, in a acquiring step, the relevant information about the object included in the video data;

determining, in a frame evaluation step, whether or not each frame satisfies an evaluation criteria based on a display state of an object in the each frame constituting the video to thereby perform a frame evaluation; and
determining, in a display timing determination step, to start displaying relevant information about the object when it is determined that the number of frames satisfying the evaluation criteria extends continuously over a threshold value as the result of the frame evaluation by the frame evaluation step,
wherein, in the display timing determination step, it is not determined to start displaying relevant information about the object even when there is one or more frame satisfying the evaluation criteria when the number of frames satisfying the evaluation criteria does not extend continuously over a threshold value as the result of the frame evaluation by the frame evaluation step.

12. The method according to claim 11, further comprising:
generating, in a generation step, graphics data for displaying relevant information about the object based on the relevant information acquired by the acquisition step.

13. The method according to claim 11, wherein, in the frame evaluation step, determining whether or not a target frame satisfies the evaluation criteria based on any one or more selected from a size of an object in the target frame, a display position, a motion amount between frames, brightness, and a face direction of the object.

14. The method according to claim 11, wherein, in the frame evaluation step, determining that the target frame satisfies the evaluation criteria when the number of objects to be displayed within the target frame is equal to or less than a threshold value.

15. The method according to claim 11, wherein, in the frame evaluation step, adopting a relative size between a first object and other second object to be evaluated as the evaluation criteria, and determining whether or not the size of the first object in an identical frame is larger than the size of the second object.

16. The method according to claim 11, wherein, in the display timing determination step, determining to display the relevant information for longer time for the object in the frame with higher evaluation value based on the result of the frame evaluation by the frame evaluation step.

17. The method according to claim 11, further comprising:
determining, in a display size determination step, a display size of relevant information about the object by acquiring the result of the frame evaluation by the frame evaluation step,
wherein, in the display size determination step, determining to set larger display size of the relevant information for the object in the frame with higher frame evaluation value.

18. The method according to claim 11, further comprising:
determining, in a display information amount determination step, the display information amount of relevant information about the object by acquiring the result of the frame evaluation by the frame evaluation step,
wherein, in the display information amount determination step, determining to set larger volume of display information of the relevant information for the object in the frame with higher frame evaluation value.

19. The method according to claim 11, wherein, in the display timing determination step, referring to a display history of the relevant information of the object, and
wherein, in the display timing determination step, it is not determined to start displaying relevant information about the object even when the number of frames satisfying the evaluation criteria extends continuously over the threshold when a predetermined time does not elapsed from the time when the relevant information of a same object was displayed in the past.

20. The method according to claim 12, further comprising:
holding, in a holding step, the video data in a buffer unit for a certain period of time; and
superimposing, in a superimposing step, graphics data generated by the generation step to the video data hold for the certain period of time by the holding step,
wherein display of the relevant information about the object is started from a first frame which satisfies the evaluation criteria.

* * * * *